(12) United States Patent
Gao et al.

(10) Patent No.: US 8,107,546 B2
(45) Date of Patent: Jan. 31, 2012

(54) DETECTION METHOD OF SPACE DOMAIN MAXIMUM POSTERIORI PROBABILITY IN A WIRELESS COMMUNICATION SYSTEM

(75) Inventors: Xiqi Gao, Nanjing (CN); Xiaohu You, Nanjing (CN); Wenjin Wang, Nanjing (CN); Dong-Seung Kwon, Daejeon (KR); Seung-Jun Lee, Daejeon (KR)

(73) Assignees: Southeast University, Nanjing (CN); Electronics and Telecommunications Research Institute, Daejeon (KR)

( * ) Notice: Subject to any disclaimer, the term of this patent is extended or adjusted under 35 U.S.C. 154(b) by 498 days.

(21) Appl. No.: 12/225,908

(22) PCT Filed: Jan. 26, 2007

(86) PCT No.: PCT/CN2007/000304
§ 371 (c)(1),
(2), (4) Date: Jan. 28, 2009

(87) PCT Pub. No.: WO2007/112637
PCT Pub. Date: Oct. 11, 2007

(65) Prior Publication Data
US 2009/0161805 A1 Jun. 25, 2009

(30) Foreign Application Priority Data
Mar. 31, 2006 (CN) .......................... 2006 1 0066285

(51) Int. Cl.
*H04K 1/10* (2006.01)
(52) U.S. Cl. ........ 375/260; 375/262; 375/265; 375/267; 375/325; 375/341; 375/340; 375/346
(58) Field of Classification Search .................. 375/260, 375/262, 265, 267, 325, 341, 340, 346
See application file for complete search history.

(56) References Cited

U.S. PATENT DOCUMENTS

| | | | |
|---|---|---|---|
| 2002/0141518 A1* | 10/2002 | Piirainen | ........................ 375/346 |
| 2003/0076908 A1* | 4/2003 | Huang et al. | ................... 375/350 |
| 2005/0175131 A1 | 8/2005 | Kansanen et al. | |

FOREIGN PATENT DOCUMENTS

| | | |
|---|---|---|
| CN | 1437345 A | 8/2003 |
| CN | 1674482 A | 9/2005 |
| CN | 1674484 A | 9/2005 |
| WO | WO 2005/076556 A1 | 8/2005 |

OTHER PUBLICATIONS

International Search Report, dated May 17, 2007, corresponding to PCT/CN2007/000304.

* cited by examiner

*Primary Examiner* — Kabir A Timory
(74) *Attorney, Agent, or Firm* — Christie, Parker & Hale, LLP

(57) ABSTRACT

A detection method of space domain maximum posteriori probability (MAP) in a wireless communication system is a kind of detection technique of space domain MAP in a multi-aerial wireless communication system, which makes the detection of iteration soft interference elimination for the interference signals in the other moments, and makes the MAP detection or the simplified MAP detection for the all signals in current time and space domain. It includes the steps of: taking a fading block as a unit; the received signals are matched and combined in time domain and space domain, and calculating an equivalent channel matrix; making the sequence detection, calculating estimation and variance of the signals before the ending of detecting internal iteration; when the internal iteration detection finishes, the result is outputted, or is outputted after hard decision.

4 Claims, 1 Drawing Sheet

DETECTION METHOD OF SPACE DOMAIN MAXIMUM POSTERIORI PROBABILITY IN A WIRELESS COMMUNICATION SYSTEM

CROSS-REFERENCE TO RELATED APPLICATION

This application is a National Phase Patent Application and claims the priority of International Application Number PCT/CN2007/000304, filed on Jan. 26, 2007, which claims priority of Chinese Patent Application Number 200610066285.4, filed on Mar. 31, 2006.

FIELD OF THE INVENTION

The present invention relates to a detection technique of space domain maximum a posteriori probability in a wireless communication system, and pertains to the technical field of high-speed wireless transmission.

BACKGROUND OF THE INVENTION

Employing multi-antenna transmitting and multi-antenna receiving technique in a wireless communication system can improve transmitting capacity of the communication system in many times theoretically. However, at the receiving end in a multi-antenna wireless communication system, signal interference in space domain (i.e., between antennas) exists. When signal transmission is carried out on a single carrier of wide band or multiple carriers of wide sub-bands, the wireless channel of each carrier becomes a frequency selective channel, i.e., inter-symbol interference in different times exists. Therefore, in a frequency selective channel environment, signal interference between different antennas, signal interference in different times, and Additive White Gaussian Noise (AWGN) exist at the receiving end of the multi-antenna system. In a multi-antenna system, the detector part of the receiver must recover the transmitted signals from the multi-antenna receiving signals superposed with signals from different transmitting antennae. The maximum a posteriori probability (MAP) detecting method for interference in time domain and space domain dimensions has unrealizable complexity in case there is a large number of transmitting antennae or multi-paths, and therefore can't be used in practical systems. In ordinary outdoor channel environments, usually direct paths exist, and correlation between antennae exists; for such channels, MMSE or ZF based detecting method can't achieve ideal performance.

In practical communication systems, usually error control encoding is utilized, in order to resist noise and interference; however, high-performance error control encoding methods usually employ soft decision decoding, i.e., the soft information of the bits must be provided, instead of hard decision decoding; therefore, the detector must provide soft information of the bits. At the receiving end, utilizing an iterative detection decoding receiver in which the detector works with the decoder in an iterative mode can greatly improve performance, when compared to a traditional receiver in which the detector and the decoder work with each other in a cascade mode. However, an iterative detection decoding receiver requires that the detector must take soft input and provide soft output, i.e., the detector must can not only soft output decision information to the decoder but also utilize the feedback result from the decoder as a priori information. It is an important task to seek for a soft input and soft output detector that has high performance but low complexity for multi-antenna wireless communication systems in a frequency selective channel environment with spatial correlation and direct path component, in order to support wide application of multi-antenna wireless communication systems.

Suppose the number of transmitting antennae is N, the number of receiving antennae is M, and the number of channel paths is L. In a frequency selective channel, suppose the complex baseband transmitting signal on antenna n in time k is $s'_{n,k}$, the signal received on receiving antenna m is $r'_{m,k}$, and set the signal response transmitted from transmitting antenna n to transmitting antenna m in path l is $h_{m,n,l}$; then the relationship between transmitted baseband signals and received baseband signals is:

$$r'_{m,k} = \sum_{l=1}^{L}\sum_{n=1}^{N} h_{mn,l} s'_{n,k} + z_{m,k} \quad [1]$$

It can be denoted in the following expression in matrix and vector form:

$$r'_k = \sum_{l=0}^{L-1} H_l s'_{k-l} + z_k \quad [2]$$

wherein:

$r'_k = [r'_{1,k}, r'_{2,k}, \ldots, r'_{M,k}]^T$, $s'_k = [s'_{1,k}, s'_{2,k}, \ldots, s'_{N,k}]^T$, $z_k = [z_{1,k}, z_{2,k}, \ldots, z_{M,k}]^T$, $$H_l = \begin{bmatrix} h_{11,l} & h_{12,l} & \cdots & h_{1N,l} \\ h_{21,l} & h_{21,l} & \cdots & h_{2N,l} \\ \vdots & \vdots & \ddots & \\ h_{M1,l} & \cdots & & h_{MN,l} \end{bmatrix}.$$

SUMMARY OF THE INVENTION

Technical problem: the object of the present invention is to provide a space domain maximum a posteriori probability (MAP) detector in a multi-antenna wireless system in a frequency selective channel environment, which features with high performance and low complexity in implementation, and can meet the requirement of an iterative detection decoding receiver for soft input and soft output of detector.

Technical scheme: The detection method of space domain maximum a posteriori probability (MAP) in a wireless communication system in the present invention performs iterative soft interference cancellation detection for the interference signals in other moments, but performs maximum a posteriori probability (MAP) detection or simplified MAP detection for all signals in the current time in space domain, through the following steps:

1.1) Performing matched combination for received signals in time domain and space domain on individual fading block basis, and calculating an equivalent channel matrix;
1.2) Performing sequential detection, carrying out interference cancellation for the interference signals at other moments with reference to the estimated value of the signal vector obtained in step 1.1) to obtain received signals after interference cancellation, and calculating an equivalent noise variance matrix, and then performing MAP or simplified MAP detection with the obtained signals after interference cancellation, equivalent channel matrix, and equivalent noise variance matrix, to obtain the detection result;

1.3) Obtaining soft information of the bits from the detection result obtained in step 1.2), Calculating estimated values and variances of the signals before the internal iteration in the detector ends, and returning to step 1.2) to perform next detection cycle; outputting the result when the internal iteration in the detector ends, or outputting the result after hard decision.

During the interference cancellation process in step 1.2), the expectation of the interference signals is used as the estimated value of the interference signals, the equivalent noise variance matrix is calculated according to the channel matrix, variance of noise, and variance of the interference signals; the expectation and variance of the interference signals can be calculated from the detection result in the last detection cycle or from the soft information provided from the decoder.

Alternatively, the detecting method can be implemented in a simplified manner through the following steps:

3.1) Initialization: for each k, calculating:

$$x'_k = \sum_{l=0}^{L-1} H_l^H r'_{k+l},$$

and calculating $$G' = [\, G'_{-(L-1)} \;\; \ldots \;\; G'_0 \;\; \ldots \;\; G'_{L-1} \,]$$

$$= [\, H_0^H \;\; H_1^H \;\; \ldots \;\; H_{L-1}^H \,] \begin{bmatrix} H_{L-1} & \ldots & H_0 & & \\ & \ddots & & \vdots & \\ & & & H_{L-1} & H_0 \end{bmatrix}$$

$G'_1$ is a matrix obtained by removing $G'_0$ from $G'$, expanding the real part and virtual Part of $G'_0$ and $G'_1$ to form new real matrixes, i.e., $$G_0 = \begin{bmatrix} \mathrm{Re}(G'_0) & -\mathrm{Im}(G'_0) \\ \mathrm{Im}(G'_0) & \mathrm{Re}(G'_0) \end{bmatrix},$$

$$G_l = \begin{bmatrix} \mathrm{Re}(G'_l) & -\mathrm{Im}(G'_l) \\ \mathrm{Im}(G'_l) & \mathrm{Re}(G'_l) \end{bmatrix};$$

expanding the real part and virtual part of $x'_k$ as follows:

$$x_k = \begin{bmatrix} \mathrm{Re}(x'_k) \\ \mathrm{Im}(x'_k) \end{bmatrix};$$

performing Cholesky factorization for $G_0$, to obtain $G_0 = U_1^T U_1$, wherein, $U_1$ is a upper triangular matrix composed of real numbers; calculating $\tilde{G}_1$ and $\tilde{F}_1$, wherein, $\tilde{G}_1 = U_1^{-T} G_1$, each element of $\tilde{F}_1$ is the square of the corresponding element in $\tilde{G}_1$;

3.2) Sequential detection: performing the following steps in sequence for k=1 ... K:

3.2.1) Interference cancellation: calculating $\hat{x}_k = x_k - G_1 E[u_{1,k}]$, $\eta_k = \tilde{F}_1 v_k$, wherein, $u_{1,k}$ is a vector composed of interference signals, $v_k$ is a vector composed of variances of interference signals;

3.2.2) Calculating $\hat{s}_k = G_0^{-1} \hat{x}_k$, for n=1, ..., 2N, calculating $\rho_n = 1/\sqrt{\eta_{k,n} + \sigma_z^2}$, and then multiplying the $n^{th}$ row of $U_1$ by $\rho_n$, to obtain a new upper triangular matrix U;

3.2.3) for all bits $b_i$ corresponding to signal vector $s_k$, calculating:

$$L_{D,E}(b_i) = \min_{s_k: b_i = -1} \left\{ \|U(\hat{s}_k - s_k)\|^2 - \sum_{n=1}^{N} \log P(s_{n,k}) \right\} -$$

$$\min_{s_k: b_i = +1} \left\{ \|U(\hat{s}_k - s_k)\|^2 - \sum_{n=1}^{N} \log P(s_{n,k}) \right\} - L_A(b_i)$$

3.2.4) If the current iteration is the last iteration cycle of internal detection, outputting the result; otherwise reconstruct estimated value and variance of the signals, and repeating step 3.2).

Functional effects: The detection method of space domain maximum a posteriori probability (MAP) in a multi-antenna wireless communication system in a frequency selective channel environment in the present invention has performance much superior to linear detection methods such as MMSE method when the channel condition is harsh, i.e., severe direct paths or strong correlation between antennae exist. But the complexity in implementation of the method is much lower than that of conventional MAP methods, especially in the cases that a large number of channel paths exist. At a lower complexity, the detection method settles the problem that MAP detectors can't be implemented in a multi-antenna system in a frequency selective channel environment due to extremely high complexity, and settles the problem that linear soft-input and soft-output detection methods have poor performance or event can't work normally under poor channel condition.

DETAILED DESCRIPTION OF THE EMBODIMENTS

Figure 1:
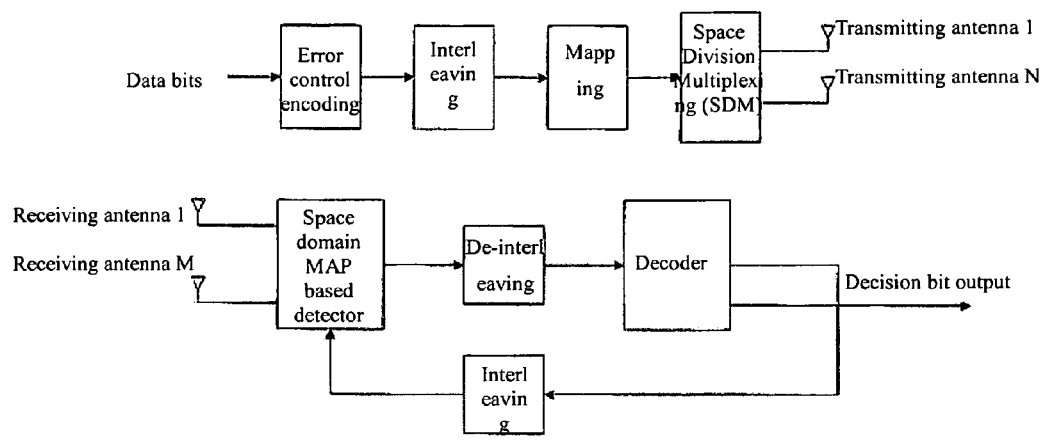
FIG. 1 are schematic diagrams of an encoding multi-antenna communication system and iterative receiver for space domain MAP detection.
Figure 2:
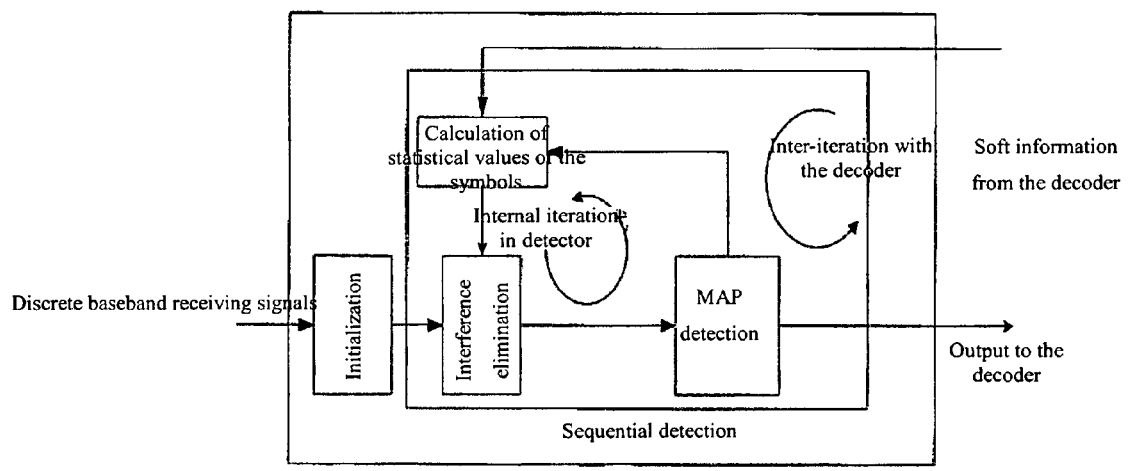
FIG. 2 is a schematic diagram of soft-input and soft-output space domain MAP detector.

The upper part of FIG. 1 illustrates a transmitter applicable to the communication system in the present invention, and the lower part of FIG. 1 illustrates an iterative receiver applicable to the communication system in the present invention. FIG. 2 is a schematic diagram of soft-input and soft-output space domain MAP detector. The technical scheme mainly comprises four steps: initialization, interference cancellation, MAP detection, and calculation of symbol probability and statistical values. Hereunder the four steps will be detailed, and the workflow of the detector will be discussed finally.

1. Initialization:

The detector works on individual block basis, i.e., in a block, the channel is deemed as time-independent. Suppose the block length is K. The initialization comprises the following steps in sequence:

(1.1) Time-space combination: for each k=1, ..., K, calculate:

$$x'_k = \sum_{l=0}^{L-1} H_l^H r'_{k+l}$$

(1.2) Calculate an equivalent channel coefficient matrix:

$$G' = [G'_{-(L-1)} \ldots G'_0 \ldots G'_{L-1}]$$

$$= [H_0^H H_1^H \ldots H_{L-1}^H] \begin{bmatrix} H_{L-1} & \ldots & H_0 \\ & \ddots & \vdots \\ & & H_{L-1} & H_0 \end{bmatrix}$$

Let $G'_1$ is a matrix obtained by removing $G'_0$ from $G'$, (1.3) Expansion of complex signals into real signals: expand the real part and virtual part of $G'_0$, $G'_1$, and $x'_k$, i.e.:

$$G_0 = \begin{bmatrix} \text{Re}(G'_0) & -\text{Im}(G'_0) \\ \text{Im}(G'_0) & \text{Re}(G'_0) \end{bmatrix},$$

$$G_1 = \begin{bmatrix} \text{Re}(G'_1) & -\text{Im}(G'_1) \\ \text{Im}(G'_1) & \text{Re}(G'_1) \end{bmatrix},$$

$$x_k = \begin{bmatrix} \text{Re}(x') \\ \text{Im}(x') \end{bmatrix},$$

(1.4) Cholesky factorization: $G_0 = U_1^T U_1$, wherein, $U_1$ is a upper triangular matrix composed of real numbers, (1.5) Calculate $\tilde{G}_1$ and $\tilde{F}_1$, wherein, $\tilde{G}_1 = U_1^{-T} G_1$, each element of $\tilde{F}_1$ is the square of the corresponding element in $\tilde{G}_1$;

2. Interference Cancellation:

In this step, interference cancellation is carried out for the signals at other moments, and then the variance of interference noises is calculated; next, a new upper triangular matrix is calculated with the variance matrix, and the zero-forcing (ZF) solution of the signals is calculated. The detail steps as follows:

(2.1) Interference cancellation and calculation of variance of interference noise: calculate $\hat{x}_k = x_k - G_1 E[u_{1,k}]$, wherein, $u_{1,k} = [s_{k-L+1}^T, \ldots, s_{k-1}^T, s_{k+1}^T, \ldots, s_{k+L-1}^T]^T$. Calculate $\eta_k = \tilde{F}_1 v_k$, wherein, $v_k$ is a column vector, and each element in $v_k$ is equal to the variance of the corresponding element in $u_{1,k}$.

(2.2) Calculate a new upper triangular matrix: for n=1, ..., 2N, calculate $\rho_n = 1/\sqrt{\eta_{k,n} + \sigma_z^2}$, and then multiply the $n^{th}$ row of $U_1$ by $\rho_n$, to obtain a new upper triangular matrix U;

(2.3) Calculate the ZF solution of the signals: $\hat{s}_k = G_0^{-1} \hat{x}_k$.

3. MAP Detection:

In this step, the likelihood ratios (i.e., external detection information) of specific bits are calculated according to the upper triangular matrix U, ZF solution $\hat{s}_k$ and a priori probability $P(s_{n,k})$.

$$L_{D,E}(b_i) = \min_{s_k: b_i = -1} \left\{ \|U(\hat{s}_k - s_k)\|^2 - \sum_{n=1}^{2N} \log P(s_{n,k}) \right\} - \quad (3)$$

$$\min_{s_k: b_i = +1} \left\{ \|U(\hat{s}_k - s_k)\|^2 - \sum_{n=1}^{2N} \log P(s_{n,k}) \right\} - L_A(b_i)$$

If expression [3] is calculated with an exhaustion method, the complexity of computation will increase exponentially as N increases. In the present invention, a search method with lower complexity is used, as follows:

(3.1) Search for a vector b, in which each element is ±1, and the real signal vector s obtained by mapping b will make the value of $$\|U(\hat{s}_k - s)\|^2 - \sum_{n=1}^{2N} \log P(s_n)$$

minimum. This step can be implemented through the following process:

(3.1.1) For i=1, ..., 2N, j=i+1, ..., 2N, $q_{ii} = u_{ii}^2$, $q_{ij} = u_{ij}/u_{ii}$; let n=2N; $C_{opt} = +\infty$; $C_{cur} = 0$; $\theta_n = 0$; $t_n = 1$;

For each possible value $\alpha_l$ of $S_n$, calculate $\mu_{n,l} = q_{nn}(\alpha_l - \hat{s}_n)^2 - \log P(s_n = \alpha_l)$, sort $\mu_{n,l}$ in ascending order, to obtain a group of sequence numbers d(l) that makes $\mu_{n,d(1)} < \mu_{n,d(2)} < \ldots \mu_{n,d(M_C)}$, wherein, $M_C$ is the number of bits corresponding to each real sign.

(3.1.2) Calculate $C_{cur} = \theta_n + \mu_{n,d(t_n)}$,

If $C_{cur} < C_{opt}$, and n>1, then go to 3.1.3)
If $C_{cur} < C_{opt}$, and n=1, then go to 3.1.4)
If $C_{cur} \geq C_{opt}$, and n=2N, then go to 3.1.6)
If $C_{cur} \geq C_{opt}$, and n<2N, then go to 3.1.5)

(3.1.3) n=n-1, $\theta_n = C_{cur}$; $t_n = 1$; for each possible signal value $\alpha_l$ of $s_n$, calculate:

$$\mu_{n,l} = q_{nn}\left(\alpha_l - \hat{s}_n + \sum_{j=n+1}^{2N} q_{nj}(s_j - \hat{s}_j)\right)^2 - \log P(s_n = \alpha_l)$$

Sort $\mu_{n,l}$ in ascending order to obtain a group of sequence numbers d(l), which makes $\mu_{n,d(1)} < \mu_{n,d(2)} < \ldots \mu_{n,d(M_C)}$; go to 3.1.2;

(3.1.4) $s_{map} = s$; $C_{opt} = C_{cur}$; n=n+1; $t_n = t_n + 1$; if $t_n > M_C$, $\mu_{n,d(t_n)} = +\infty$; go to 3.1.2;

(3.1.5) n=n+1; $t_n = t_n + 1$; if $t_n > M_C$, $\mu_{n,d(t_n)} = +\infty$; go to 3.1.2;

(3.1.6) Map $s_{map}$ reversely to $b_{map}$; output the resulting $b_{map}$ and $C_{map} = C_{opt}$.

(3.2) For i=1 ... 2N, search for a bit vector $\hat{b}$ respectively, wherein, the $i^{th}$ bit vector $\hat{b}_i$ meets $\hat{b}_i = -b_{map,i}$ and ensures the real signal vector s obtained by mapping $\hat{b}$ makes the value of $$C_i = \|U(\hat{s}_k - s)\|^2 - \sum_{n=1}^{2N} \log P(s_n)$$

minimum; output the minimum $C_i$. This step can be implemented as follows:

(3.2.1) Let n=2N; $C_{opt} = +\infty$; $C_{cur} = 0$; $\theta_n = 0$; $t_n = 1$;

For each possible value $\alpha_l$ of $s_n$ that meets $\hat{b}_i = -b_{map,i}$, calculate $\mu_{n,l} = q_{nn}(\alpha_l - \hat{s}_n)^2 - \log P(s_n = \alpha_l)$ and sort $\mu_{n,l}$ in ascending order, to obtain a group of sequence numbers d(l) that makes $\mu_{n,d(1)} < \mu_{n,d(2)} < \ldots \mu_{n,d(M_C')}$; if $s_n$ contains $\hat{b}_i$, then $M_C' = M_C/2$; if $s_n$ doesn't contain $\hat{b}_i$, then $M_C' = M_C$.

(3.2.2) Calculate $C_{cur}=\theta_n+\mu_{n,d(t_n)}$.

If $C_{cur}<C_{opt}$, and n=1, then go to 3.2.3)

If $C_{cur}<C_{opt}$, and n=1, then go to 3.2.4)

If $C_{cur}\leq C_{opt}$, and n=2N, then go to 3.2.6)

If $C_{cur}\leq C_{opt}$, and n=2N, then go to 3.2.5)

(3.2.3) n=n−1; $\theta_n=C_{cur}$; $t_n=1$; for each possible signal value $\alpha_1$ of $s_n$ that meets $b_i=-b_{map}$, calculate $$\mu_{n,l} = q_{nn}\left(\alpha_l - \hat{s}_n + \sum_{i=n+1}^{2N} q_{nj}(s_j - \hat{s}_j)\right)^2 - \log P(s_n = \alpha_l)$$

Sort $\mu_{n,l}$ in ascending order, to obtain a group of sequence numbers d(l) that makes $\mu_{n,d(1)}>\mu_{n,d(2)}>\ldots\mu_{n,d(M_C)}'$; go to (3.2.2).

(3.2.4) $s_{map}=s$; $C_{opt}=C_{cur}$; n=n+1; $t_n=t_n+1$; if $t_n>M_c'$; $\mu_{n,d(t_n)}=+\infty$; go to (3.2.2).

(3.2.5) n=n+1; $t_n=t_n+1$; if $t_n>M_c'$, $\mu_{n,d(t_n)}=+\infty$; go to (3.2.2);

(3.2.6) $C_l=C_{opt}$.

(3.3) For each bit $b_i$, calculate $L_{D,E}(b_i)=\hat{b}_{map,l}(C_l-C_{map})-L_A(b_l)$.

In the MAP detection step, the likelihood ratio of bit can be obtained with above method. When the detection iteration for a block is completed, the likelihood ratio can be outputted to the cecoder for soft decision decoding; before the detection iteration for a block is completed, the likelihood ratio can be used to reconstruct average value and variance of the signals; then, the interference cancellation step and the MAP detection step can be repeated.

(4.) Calculation of symbol probability and statistical values:

In the internal iteration process in the detector or the iteration process between the detector and the decoder, the likelihood ratios of bits must be converted to statistical values of symbols, i.e., expectation and variance, so as to perform interference cancellation. In addition, in the MAP detection procedure, a signal equal to the logarithm of probability of the symbols in the symbol set is required; the probability can be reconstructed from the soft information of bits from the decoder.

(4.1) Calculate symbol probability from soft information of bits

Suppose a bit sequence $b_{n,k,j}$, j=1, . . . , $M_C$ is mapped to symbol α, then the symbol probability can be calculated from soft information with the following expression:

$$P(s_{n,k} = \alpha) = \prod_{j=1}^{M_C} P(b_{n,k,j})$$

(4.2) Calculate statistical values of symbols with symbol probability:

The expectation value can be calculated with the following expression:

$$E[s_{n,k}] = \sum_{\alpha} \alpha P(s_{n,k} = \alpha)$$

The variance value can be calculated with the following expression:

$$\text{cov}[s_{n,k}] = \sum_{\alpha} |\alpha|^2 P(s_{n,k} = \alpha) - E[s_{n,k}]^2$$

5. Workflow of detector

In the initial detection and decoding cycle of the iterative detection and encoding receiver, since no soft information from the decoder is available, the detector performs iteration internally first. In the subsequent detection and decoding process, the decoder provides soft information, the detector doesn't any longer perform internal iteration; instead, the iteration is performed between the detector and the decoder. The present invention provides a soft-input and soft-output detection method of space domain maximum a posteriori probability in an multi-antenna wireless communication system in a frequency selective channel environment, which features with lower complexity and robust performance. The implementation is as follows:

1) Determine the system parameters, such as the number of transmitting antennae, number of receiving antennaie, maximum number of multi-paths of channel, and error control encoding mode, etc. In this embodiment, the number of transmitting antennaie is 4, the number of receiving antennae is 4, the number of multi-paths of channel is 6, and the error control encoding mode is Turbo coding with ½ code rate.

2) Determine the number of self-iterations of the detector according to the requirement of the receiving end for complexity and performance: if the detector is iterative, the number of iterations between the detector and the decoder must be determined further. In this embodiment, the number of self-iterations of the detector during initial detection decoding is 2; the number of iterations between the detector and the decoder is 3.

3) Design a soft-inpout and soft-out detection method according to technical scheme 1-5, and implement through the following steps:

3.1) Take the received signals in a fadin gblock as the object, and perform initialization with the method described above.

3.2) Take the initialized signals in a fading block as the object, and perform two times iterative sequential detection in the detector; the sequential detection comprises three steps: interference cancellation, space domain MAP detection, and calculation of statistical values of the symbols, which are implemented through the steps of interference cancellation space domain MAP detection, and calculation of symbol probability and statistical values of the symbols as described above.

3.3) Perform three times iterative sequential detection between the detector and the decoder, the decoder can employ any soft-input and soft-output decoding method; the sequential detection comprises three steps: interference cancellation, space domain MAP detection, and calculation of statistical values of the symbols, which are implemented through the steps of interference cancellation, space domain MAP detection, and calculation of symbol probability and statistical values of the symbols as described above.

3.4) Output the final result.

The invention claimed is:

1. A detection method of space domain maximum a posteriori probability (MAP) in a wireless communication system comprising a detector configured to perform an internal iteration, which is characterized in that it performs iterative soft interference cancellation detection for interference signals in other moments, but performs maximum a posteriori probability (MAP) detection or simplified MAP detection for all signals in a current time in space domain, through the following steps:

1.1) performing matched combination of received signals in time domain and space domain on individual fading block basis to compute a signal vector, and calculating an equivalent channel matrix;

1.2) performing sequential detection, carrying out interference cancellation for the interference signals at other moments with reference to an estimated value of the signal vector obtained in step 1.1) to obtain received signals after interference cancellation, and calculating an equivalent noise variance matrix, and then performing the MAP or simplified MAP detection with the obtained received signals after interference cancellation, the equivalent channel matrix, and the equivalent noise variance matrix, to obtain a detection result comprising soft information of bits; and 1.3) obtaining the soft information of the bits from the detection result obtained in step 1.2), calculating an estimated value and a variance of the signals before the end of the internal iteration in the detector, and returning to step 1.2) to perform a next detection cycle; outputting a result at the end of the internal iteration in the detector, or outputting the result after a hard decision.

2. The detection method of space domain maximum a posteriori probability (MAP) in a wireless communication system according to claim 1, wherein, during the interference cancellation process in step 1.2), the expectation of the interference signals is used as an estimated value of the interference signals, the equivalent noise variance matrix is calculated according to the equivalent channel matrix, the variance of noise, and the variance of the interference signals; and wherein the expectation and variance of the interference signals are calculated from the detection result in the last detection cycle or from the soft information.

3. The detection method of space domain maximum a posteriori probability (MAP) in a wireless communication system according to claim 1, 3.1) wherein the calculating the equivalent channel matrix G' comprises, k=1 . . . K, calculating:

$$x'_k = \sum_{l=0}^{L-1} H_l^H r'_{k+l},$$

and calculating:

$$G' = [\, G'_{-(L-1)} \; \ldots \; G'_0 \; \ldots \; G'_{L-1} \,]$$

$$= [\, H_0^H \; H_1^H \; \ldots \; H_{L-1}^H \,] \begin{bmatrix} H_{L-1} & \ldots & H_0 \\ & \ddots & \vdots \\ & & H_{L-1} & H_0 \end{bmatrix}$$

wherein $G'_1$ is a matrix obtained by removing $G'_0$ from G', expanding the real part and imaginary part of $G'_0$ and $G'_1$ to form new real matrixes, that is, $$G_0 = \begin{bmatrix} \mathrm{Re}(G'_0) & -\mathrm{Im}(G'_0) \\ \mathrm{Im}(G'_0) & \mathrm{Re}(G'_0) \end{bmatrix}, \; G_l = \begin{bmatrix} \mathrm{Re}(G'_l) & -\mathrm{Im}(G'_l) \\ \mathrm{Im}(G'_l) & \mathrm{Re}(G'_l) \end{bmatrix};$$

expanding the real part and imaginary part of $x'_k$ as follows:

$$x_k = \begin{bmatrix} \mathrm{Re}(x'_k) \\ \mathrm{Im}(x'_k) \end{bmatrix};$$

performing Cholesky factorization for $G_0$, to obtain $G_0 = U_1^T U_1$, wherein, $U_1$ is an upper triangular matrix composed of real numbers; calculating $\tilde{G}_1$ and $\tilde{F}_1$, wherein, $\tilde{G}_1 = U_1^{-T} G_1$, each element of $\tilde{F}_1$ is the square of the corresponding element in $\tilde{G}_1$; and 3.2) wherein the performing the sequential detection is performed for k=1 . . . K:

3.2.1) wherein the interference cancellation comprises calculating $\hat{x}_k = x_k - G_1 E[u_{l,k}]$, $\eta_k = \tilde{F}_1 v_k$, wherein, $u_{l,k}$ is a vector composed of the interference signals, $v_k$ is a vector composed of variances of the interference signals;

3.2.2) wherein the calculating the equivalent noise matrix comprises calculating $\hat{s}_k = G_0^{-1} \hat{x}_k$, for n=1, . . . , 2N, calculating $\rho_n = 1/\sqrt{\eta_{k,n} + \sigma_z^2}$, and then multiplying the $n^{th}$ row of $U_1$ by $\rho_n$, to obtain a new upper triangular matrix U;

3.2.3) wherein the performing the MAP or simplified MAP detection comprises, for all bits $b_i$, corresponding to the signal vector $s_k$, calculating:

$$L_{D,E}(b_i) = \min_{s_k : b_i = -1} \left\{ \|U(\hat{s}_k - s_k)\|^2 - \sum_{n=1}^{2N} \log P(s_{n,k}) \right\} -$$
$$\min_{s_k : b_i = +1} \left\{ \|U(\hat{s}_k - s_k)\|^2 - \sum_{n=1}^{2N} \log P(s_{n,k}) \right\} - L_A(b_i);$$

and 3.2.4) if the current iteration is the last iteration cycle of internal detection, outputting the result; otherwise reconstructing estimated value and variance of signals, and repeating the sequential detection, wherein K is the block length, L is the number of channel paths, N is the number of transmitting antennae, M is the number of receiving antennae, $s'_{n,k}$ is the complex baseband transmitting signal on antenna n in a k-th block, $r'_k$ is the signal received on a receiving antenna in a k-th block, $\sigma_z^2$ is the variance of the noise in the signal received $r'_k$; $h_{mn,l}$ is the signal response transmitted from a transmitting antenna n to a receiving antenna m over path l, $H_l$ is the channel matrix for the l-th tap $$\begin{bmatrix} H_{11,l} & h_{12,l} & \cdots & h_{1N,l} \\ H_{21,l} & h_{21,l} & \cdots & H_{2N,l} \\ \vdots & \vdots & \ddots & \\ h_{M1,l} & \cdots & & H_{MN,l} \end{bmatrix},$$

and $H_l^H$ is the Hermitian transpose of $H_l$.

4. The detection method of space domain maximum a posteriori probability (MAP) in a wireless communication system according to claim 2:

4.1) wherein the calculating the equivalent channel matrix G' comprises, for each k, calculating:

$$x'_k = \sum_{l=0}^{L-1} H_l^H r'_{k+l},$$

and calculating:

$$G' = [\, G'_{-(L-1)} \;\ldots\; G'_0 \;\ldots\; G'_{L-1} \,]$$

$$= [\, H_0^H \;\; H_1^H \;\ldots\; H_{L-1}^H \,] \begin{bmatrix} H_{L-1} & \ldots & H_0 & & \\ & \ddots & & \vdots & \\ & & & H_{L-1} & H_0 \end{bmatrix}$$

wherein $G'_1$ is a matrix obtained by removing $G'_0$ from $G'$; expanding the real part and imaginary part of $G'_0$ and $G'_1$ to form new real matrixes, that is, $$G_0 = \begin{bmatrix} \mathrm{Re}(G'_0) & -\mathrm{Im}(G'_0) \\ \mathrm{Im}(G'_0) & \mathrm{Re}(G'_0) \end{bmatrix}, \; G_l = \begin{bmatrix} \mathrm{Re}(G'_l) & -\mathrm{Im}(G'_l) \\ \mathrm{Im}(G'_l) & \mathrm{Re}(G'_l) \end{bmatrix};$$

expanding the real part and imaginary part of $x'_k$ as follows:

$$x_k = \begin{bmatrix} \mathrm{Re}(x'_k) \\ \mathrm{Im}(x'_k) \end{bmatrix};$$

performing Cholesky factorization for $G_0$, to obtain $G_0 = U_1^T U_1$, wherein, $U_1$ is an upper triangular matrix composed of real numbers; calculating $\tilde{G}_1$ and $\tilde{F}_1$, wherein, $\tilde{G}_1 = U_1^{-T} G_1$, each element of $\tilde{F}_1$ is the square of the corresponding element in $\tilde{G}_1$; and 4.2) wherein the performing the sequential detection is performed for k=1 ... K:

4.2.1) wherein the interference cancellation comprises calculating $\hat{x}_k = x_k - G_1 E[u_{l,k}]$, $\eta_k = \tilde{F}_1 v_k$, wherein, $u_{l,k}$ is a vector composed of the interference signals, $v_k$ is a vector composed of variances of the interference signals;

4.2.2) wherein the calculating the equivalent noise matrix comprises calculating $\hat{s}_k = G_0^{-1} \hat{x}_k$, for n=1, ..., 2N, calculating $\rho_n = 1/\sqrt{\eta_{k,n} + \sigma_z^2}$, and then multiplying the $n^{th}$ row of $U_1$ by $\rho_n$, to obtain a new upper triangular matrix U;

4.2.3) wherein the performing the MAP or simplified MAP detection comprises, for all bits $b_i$ corresponding to the signal vector $s_k$, calculating:

$$L_{D,E}(b_i) = \min_{s_k : b_i = -1} \left\{ \|U(\hat{s}_k - s_k)\|^2 - \sum_{n=1}^{2N} \log P(s_{n,k}) \right\} - \min_{s_k : b_i = +1} \left\{ \|U(\hat{s}_k - s_k)\|^2 - \sum_{n=1}^{2N} \log P(s_{n,k}) \right\} - L_A(b_i);$$

and 4.2.4) If the current iteration is the last iteration cycle of internal detection, outputting the result; otherwise reconstructing estimated value and variance of signals, and repeating the sequential detection, wherein K is the block length, L is the number of channel paths, N is the number of transmitting antennae, M is the number of receiving antennae, $s'_{n,k}$ is the complex baseband transmitting signal on antenna n in a k-th block, $r'_k$ is the signal received on a receiving antenna in a k-th block, $\sigma_z^2$ is the variance of the noise in the signal received $r'_k$, $h_{mn,l}$ is the signal response transmitted from a transmitting antenna n to a receiving channel matrix for the l-th tap $$\begin{bmatrix} H_{11,l} & h_{12,l} & \cdots & h_{1N,l} \\ H_{21,l} & h_{21,l} & \cdots & H_{2N,l} \\ \vdots & \vdots & \ddots & \\ h_{M1,l} & \cdots & & H_{MN,l} \end{bmatrix},$$

and $H_l^H$ is the Hermitian transpose of $H_l$.

\* \* \* \* \*

UNITED STATES PATENT AND TRADEMARK OFFICE
CERTIFICATE OF CORRECTION

PATENT NO.         : 8,107,546 B2                                     Page 1 of 1
APPLICATION NO.    : 12/225908
DATED              : January 31, 2012
INVENTOR(S)        : Xiqi Gao et al.

It is certified that error appears in the above-identified patent and that said Letters Patent is hereby corrected as shown below:

In the Claims

Column 9, Claim 1, line 9.          Delete "perfoiming"
                                    Insert -- performing --

Signed and Sealed this
Tenth Day of July, 2012

David J. Kappos
*Director of the United States Patent and Trademark Office*